US011378122B2

(12) United States Patent
Gonzalez et al.

(10) Patent No.: US 11,378,122 B2
(45) Date of Patent: Jul. 5, 2022

(54) RADIALLY ADJUSTABLE RADIAL PDC BEARINGS

(71) Applicant: US SYNTHETIC CORPORATION, Orem, UT (US)

(72) Inventors: Jair J. Gonzalez, Provo, UT (US); Leonidas C. Leite, Provo, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

(21) Appl. No.: 17/150,396

(22) Filed: Jan. 15, 2021

(65) Prior Publication Data
US 2021/0222734 A1 Jul. 22, 2021

Related U.S. Application Data

(60) Provisional application No. 62/961,802, filed on Jan. 16, 2020.

(51) Int. Cl.
| | |
|---|---|
| *F16C 25/02* | (2006.01) |
| *F16C 33/12* | (2006.01) |
| *F16C 33/26* | (2006.01) |
| *F16C 17/24* | (2006.01) |
| *F16C 43/02* | (2006.01) |
| *F16C 33/04* | (2006.01) |

(52) U.S. Cl.
CPC ............ *F16C 25/02* (2013.01); *F16C 17/246* (2013.01); *F16C 33/043* (2013.01); *F16C 33/12* (2013.01); *F16C 33/26* (2013.01); *F16C 43/02* (2013.01); *F16C 2206/04* (2013.01); *F16C 2226/60* (2013.01); *F16C 2237/00* (2013.01)

(58) Field of Classification Search
CPC ........ F16C 17/02; F16C 17/246; F16C 25/02; F16C 33/12; F16C 33/26; F16C 33/043; F16C 33/046; F16C 43/02; F16C 2206/04; F16C 2226/80; F16C 2237/00; F16C 33/121; F16C 2226/60; E21B 4/003
USPC .................................. 384/95, 114, 263, 282
See application file for complete search history.

(56) References Cited

U.S. PATENT DOCUMENTS

| | | | |
|---|---|---|---|
| 5,795,077 A | 8/1998 | Gozdawa | |
| 6,000,851 A * | 12/1999 | Cohen | ..................... F16C 17/03 384/114 |
| 7,866,418 B2 | 1/2011 | Bertagnolli et al. | |
| 8,297,382 B2 | 10/2012 | Bertagnolli et al. | |

(Continued)

OTHER PUBLICATIONS

U.S. Appl. No. 62/961,802, filed Jan. 16, 2020.

(Continued)

*Primary Examiner* — Alan B Waits
(74) *Attorney, Agent, or Firm* — Phillips Winchester

(57) ABSTRACT

Bearing assemblies and methods of using bearings are provided in the present disclosure. In one embodiment, a bearing ring is provided having a plurality of carrier components removably coupled therewith. Each carrier component may carry one or more bearing elements. Upon wearing of the bearing elements beyond a desired amount, the carrier components may be removed from the bearing ring and installed in a different bearing ring to place the mearing elements at their original bearing surface radius. In another embodiment, individual bearing elements may be radially adjustable relative to the bearing ring to define and redefine the radius of a radial bearing surface.

22 Claims, 13 Drawing Sheets

(56) References Cited

U.S. PATENT DOCUMENTS

| | | | | |
|---|---|---|---|---|
| 8,613,554 | B2* | 12/2013 | Tessier | F16C 33/26 384/285 |
| 8,764,295 | B2* | 7/2014 | Dadson | F16C 17/02 384/95 |
| 9,080,385 | B2 | 7/2015 | Sexton et al. | |
| 9,163,660 | B1* | 10/2015 | Sexton | B23P 15/003 |
| 9,227,302 | B1* | 1/2016 | Gleason | C23F 1/28 |
| 9,309,923 | B1* | 4/2016 | Lingwall | F16C 33/26 |
| 9,315,881 | B2 | 4/2016 | Linford et al. | |
| 9,394,942 | B2* | 7/2016 | Peterson | F16C 17/02 |
| 9,611,885 | B1* | 4/2017 | Cooley | F16C 33/043 |
| 10,011,000 | B1* | 7/2018 | Heaton | F16C 33/26 |
| 2008/0253706 | A1 | 10/2008 | Bischof et al. | |
| 2010/0237621 | A1* | 9/2010 | Tessier | F16C 17/03 290/52 |
| 2011/0174544 | A1* | 7/2011 | Scott | F16C 33/043 175/92 |
| 2012/0037425 | A1* | 2/2012 | Sexton | F16C 17/04 175/57 |
| 2015/0139573 | A1* | 5/2015 | Klusacek | F04D 29/057 384/114 |
| 2015/0152914 | A1* | 6/2015 | Gonzalez | E21B 10/00 384/284 |
| 2015/0233423 | A1* | 8/2015 | Peterson | F16C 33/043 384/416 |
| 2015/0345548 | A1* | 12/2015 | Peterson | F16C 17/10 384/282 |
| 2017/0254358 | A1 | 9/2017 | Cooley et al. | |
| 2018/0073562 | A1 | 3/2018 | Sasaki | |

OTHER PUBLICATIONS

International Application No. PCT/US21/13627, "Notification of Transmittal of the International Search Report and the Written Opinoin of the International Searching Authority, or Declaration", dated Mar. 31, 2021, p. 1-32.

* cited by examiner

RADIALLY ADJUSTABLE RADIAL PDC BEARINGS

CROSS-REFERENCE TO RELATED APPLICATIONS

This application claims priority to U.S. Provisional Application No. 62/961,802 filed on 16 Jan. 2020. The disclosure is incorporated herein, in its entirety, by this reference.

BACKGROUND

Conventional bearing apparatuses including bearing surfaces that move relative to one another are known in the art. For example, as known in the art, mechanical systems such as conventionally used in downhole drilling, may include radial bearings. In one embodiment, an inner and outer race may each be provided with a plurality of superhard bearing elements (e.g., polycrystalline diamond elements). The races may be positioned adjacent one another so that the bearing surfaces of the bearing elements of the inner race contact the bearing surfaces of the bearing elements of the outer race. In other embodiments, an inner or outer race with a plurality of bearing elements may be combined with another components that acts as a stator or rotor placed in contact with the bearing surface defined by the bearing elements.

Over time, the bearing elements may wear, creating a gap between a portion of a bearing surface of a given bearing assembly and an associated bearing component (e.g., between the bearing surfaces of an inner race and an outer race or between the bearing surface of a race and a bearing surface of a stator or rotor component). Conventionally, when the wear-gap increases beyond a specified tolerance, the bearing assembly (or assemblies), including the race and its associated bearing elements, are replaced. Often, bearing assemblies are replaced while there is significant bearing material remaining in the bearing elements. Thus, it would be advantageous to provide improved bearing assemblies and bearing apparatuses that can extend the in-service life of the bearing elements and the bearing assemblies, reducing costs and maintenance requirements on various types of equipment.

SUMMARY

The present disclosure is related to radial bearing assemblies and bearing apparatuses. In accordance with various embodiments, radial bearing assemblies are provided that enable radial adjustment of bearing elements to extend the service life of the bearing elements.

In accordance with one embodiment, a radial bearing assembly, a bearing ring having a rotation axis; a first carrier component configured to be removably coupled with the bearing ring; at least a first bearing element fixed to the at least one carrier component, wherein the first carrier component is structured to position the at least a first bearing element at a selected radial position relative to the rotational axis; a second carrier component configured to be removably coupled with the bearing ring; and at least a second bearing element fixed to the at least one carrier component, wherein the second carrier component is structured to position the at least a second bearing element at a different, selected radial position relative to the rotational axis.

In one embodiment, the at least one carrier element is disposed within a pocket formed in the bearing ring.

In one embodiment, the at least one carrier component is configured as an annulus sector.

In one embodiment, the at least one bearing element is disposed within a pocket formed in the at least one carrier element.

In one embodiment, the at least one carrier component is removable from the bearing ring by displacing the at least one carrier component in a direction that is parallel to an axis of rotation of the radial bearing assembly.

In one embodiment, the at least one bearing element includes a plurality of bearing elements.

In one embodiment, the plurality of bearing elements are arranged in a plurality of circumferential rows.

In one embodiment, the at least one bearing element includes a polycrystalline diamond table bonded to a substrate.

In one embodiment, the bearing assembly further comprises a fastener extending through the bearing ring and engaging the at least one carrier component.

In one embodiment, a bearing surface of the at least one bearing element exhibits a concave or a convex surface.

In accordance with another embodiment of the present disclosure, a radial bearing apparatus, comprises a bearing ring, at least one bearing element coupled with the bearing ring, and at least one adjustment mechanism configured to selectively, radially adjust the at least one bearing element relative to the bearing ring.

In one embodiment, the at least one adjustment mechanism includes a fastener extending through a portion of the bearing ring and having a portion that is threadably engaged with the at least one bearing element.

In one embodiment, the fastener includes a head disposed within a counterbore formed within the radial bearing.

In one embodiment, the at least one adjustment mechanism further comprises a retainer coupled to the fastener and configured to constrain radial displacement of the fastener relative to the bearing ring.

In one embodiment, the fastener is threadably coupled with the bearing ring.

In accordance with a further embodiment, a method of using a bearing is provided. The method comprises: providing a radial bearing assembly having a bearing ring, a plurality of carrier components coupled with the bearing ring, and a plurality of bearing elements including at least one bearing element coupled with each of the plurality of carrier components, each of the plurality of bearing elements having a bearing surface, wherein the bearing surfaces of the bearing elements are positioned substantially at a selected radius; wearing the plurality of bearing elements such that at least one of the bearing surfaces is positioned at a radius different from the selected radius; removing the plurality of carrier components from the first bearing ring and coupling them to a second bearing ring such that the plurality of bearing elements are again positioned substantially at the selected radius.

In one embodiment, wearing the plurality of bearing elements includes results in the bearing surface of at least one radius being positioned at a radius that is larger than the selected radius.

In one embodiment, wherein wearing the plurality of bearing elements includes results in the bearing surface of at least one radius being positioned at a radius that is smaller than the selected radius.

In accordance with another embodiment, a further method of using a bearing is provided. The method comprises: providing a radial bearing assembly having a bearing ring and a plurality of bearing elements coupled with the bearing ring, each of the plurality of bearing elements having a bearing surface, wherein at least one of the bearing surfaces of the plurality of bearing elements is positioned at an undesirable radius; radially adjusting the position of the at least one bearing element relative to the bearing ring such that the at least one bearing element is positioned at a selected radius.

In one embodiment, radially adjusting the position of the bearing elements relative to the bearing ring includes adjusting a plurality of adjustment mechanisms, each adjustment mechanism being associated with a one of the plurality of a bearing elements.

In one embodiment, the plurality of bearing elements includes a plurality of worn bearing elements.

In accordance with another embodiment, an apparatus is provided comprising: a first bearing assembly comprising at least a first bearing element coupled with the first bearing ring; a second bearing assembly comprising at least second bearing element coupled with second bearing ring, the first and second bearing assembly being positioned so as to define a radial gap between a surface of the at least a first bearing element and the at least a second bearing element; at least a first adjustment mechanism associated with the at least a first bearing element and configured to selectively, radially adjust the at least a first bearing element relative to the first bearing ring to alter the radial gap.

In one embodiment, the first bearing assembly is an outer radial bearing assembly and the second bearing assembly is an inner radial bearing assembly.

In one embodiment, the first bearing assembly is an inner radial bearing assembly and the second bearing assembly is an outer radial bearing assembly.

In one embodiment, the apparatus further comprises at least a second adjustment mechanism associated with the at least a second bearing element and configured to selectively, radially adjust the at least a second bearing element relative to the second bearing ring to alter the radial gap.

Features from any of the above mentioned embodiments may be used in combination with one another, without limitation. In addition, other features and advantages of the instant disclosure will become apparent to those of ordinary skill in the art through consideration of the ensuing description, the accompanying drawings, and the appended claims.

BRIEF DESCRIPTION OF THE DRAWINGS

Further features of the subject matter of the instant disclosure, its nature, and various advantages will be more apparent from the following detailed description and the accompanying drawings, which illustrate various exemplary embodiments, are representations, and are not necessarily drawn to scale, wherein.

DETAILED DESCRIPTION

The present disclosure relates generally to bearing assemblies that enable radial bearing surfaces to be radially adjustable. The bearing assemblies may include bearing surfaces comprising superhard materials. "Superhard," as used herein, refers to any material having a hardness that is at least equal to or exceeds a hardness of tungsten carbide (e.g., polycrystalline diamond, boron nitride, silicon carbide, mixtures of the foregoing, or any suitable material). In one embodiment, a bearing apparatus may include polycrystalline diamond inserts or compacts defining a plurality of surfaces that move relative to one another (or relative to some other surface or mechanical component). Bearing assemblies of the present disclosure enable extended use of bearing elements and, therefore, extended life of the bearing assemblies, through simple and efficient maintenance of the assemblies.

Figure 1:
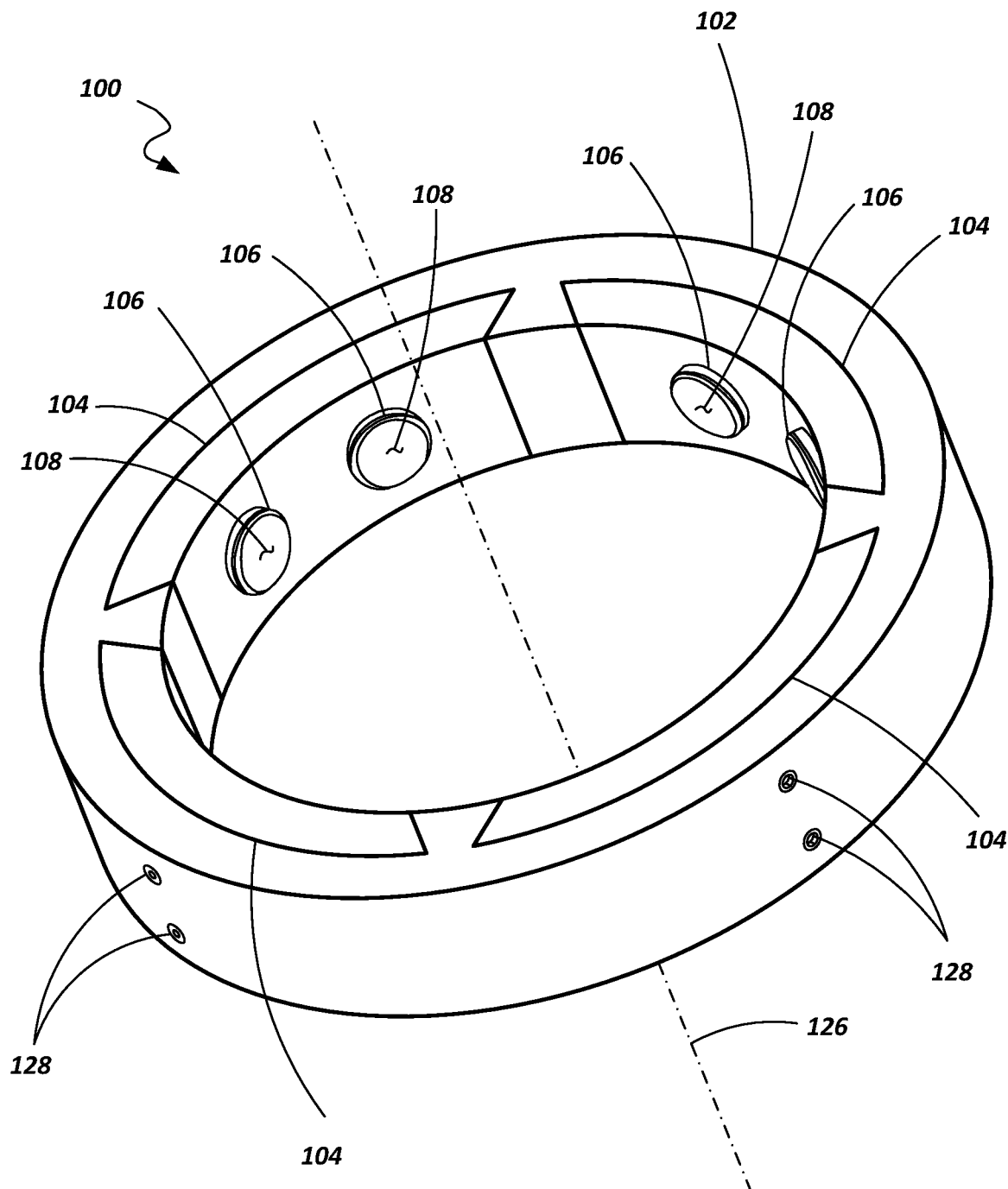
FIG. 1 shows a perspective view of a radial bearing assembly according to an embodiment of the present disclosure.
Figure 2:
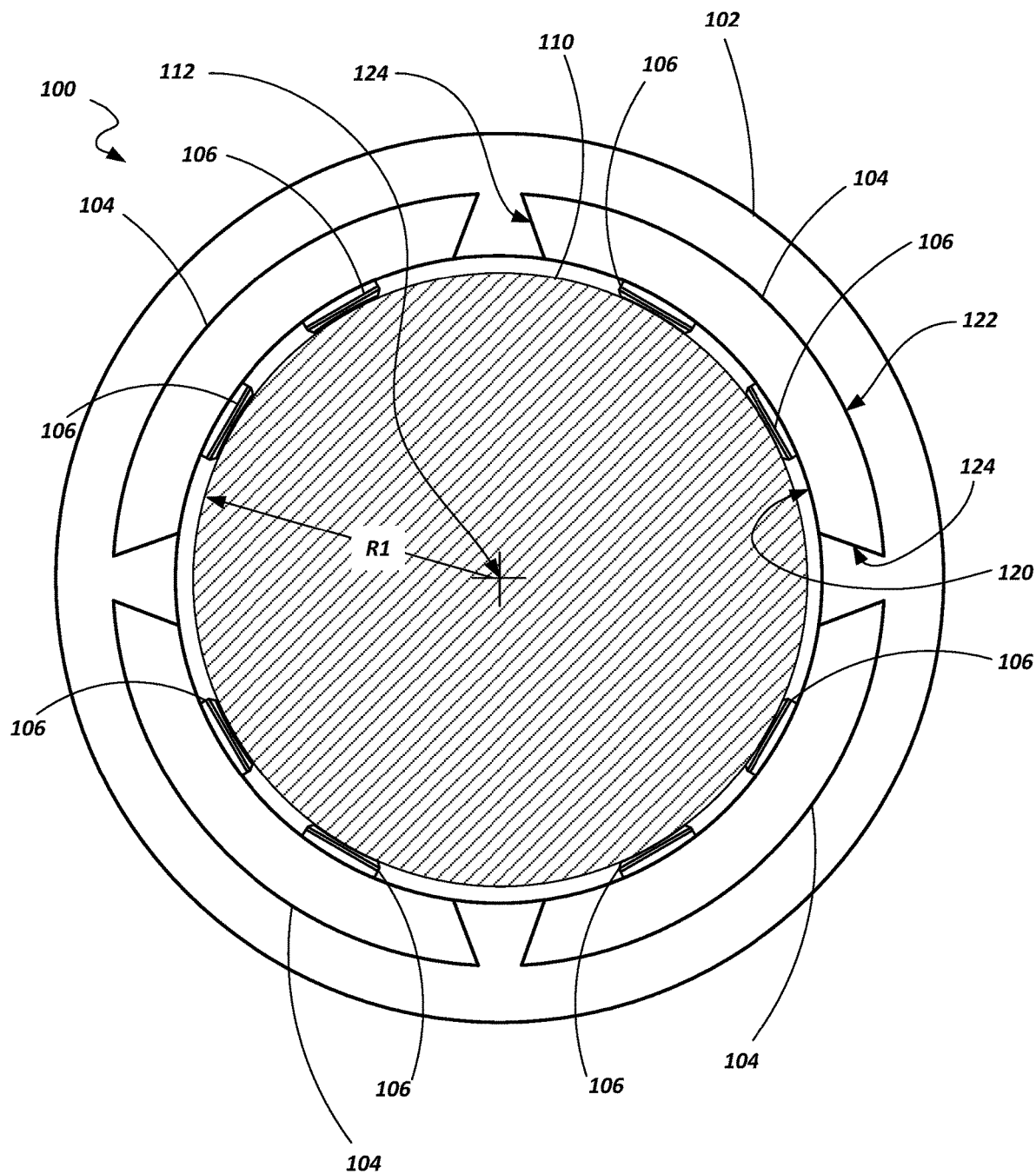
FIG. 2 shows a front view of the bearing assembly shown in FIG. 1.

Referring to FIGS. 1 and 2, in accordance with one embodiment of the present disclosure, a radial bearing assembly 100 may include a body, or a bearing ring 102, having one or more carrier components 104 mounted thereto. Each carrier component 104 may include one or more bearing elements 106 mounted in the carrier component 104. For example, the bearing elements 106 may be disposed within a pocket formed in the carrier element 104 such as by brazing, by press fit, by way of adhesive, by way of mechanical fasteners, or by way of other mechanical fastening or material joining techniques. It is noted that the bearing assembly 100 shown in FIGS. 1 and 2 is configured as an "outer" radial bearing assembly meaning that the bearing assembly is placed radially outward of another bearing component such as an inner bearing assembly, a shaft 110 serving as a rotor or stator or some other bearing member. In some embodiments, the bearing elements 106 may exhibit a concave bearing surface 108. The bearing surface of the bearing assembly 100, having a radius of R1, which is substantially the radial position of each of the individual bearing surfaces 108 of the bearing elements 106, is the radially innermost surface of the assembly 100.

In one embodiment the bearing ring 102 may be formed of a metal material (e.g., titanium, Incoloy, Inconel, steel, stainless steel or any suitably metal alloy). Similarly, the carrier component 104 may be formed of a metal material. In some embodiments, the bearing elements 106 may be formed of superhard materials. For example, the bearing elements 106 may include polycrystalline cubic boron nitride, polycrystalline diamond or other superhard materials. In some embodiments, the bearing elements 106 may include a superhard table defining a bearing surface 108 of the bearing element 106. In some embodiments, the bearing element 106 may comprise a polycrystalline diamond compact ("PDC") including a polycrystalline diamond ("PCD") table to which a substrate is bonded. In some embodiments, the interface between the table and the substrate may be substantially flat or planar. In other embodiments, the interface may be domed or curved. In other embodiments, the interface between the table and the substrate may include a plurality of raised features or recessed features (e.g., dimples, grooves, ridges, etc.). In some embodiments, the substrate may comprise a cobalt-cemented tungsten carbide substrate bonded to the table. When a polycrystalline diamond table is formed together with the substrate, the bearing element 106 may be referred to polycrystalline diamond compact, or PDC.

In certain embodiments, the table may exhibit a maximum thickness (e.g., from the bearing surface to the interface between the table and the substrate) that is approximately 0.1 inch or greater. In other embodiments, the table may exhibit a maximum thickness of as great as 0.5 inch or greater. Examples of bearing elements having various thicknesses and various configurations are described in U.S. Pat. No. 9,080,385, issued Jul. 14, 2015 to Gonzalez et al., the disclosure of which is hereby incorporated by reference in its entirety.

The PCD table includes a plurality of directly bonded-together diamond grains exhibiting diamond-to-diamond bonding therebetween (e.g., sp3 bonding), which define a plurality of interstitial regions. A portion of, or substantially all of, the interstitial regions of the PCD table may include a metal-solvent catalyst or a metallic infiltrant disposed therein that is infiltrated from the substrate or from another source during fabrication. For example, the metal-solvent catalyst or metallic infiltrant may be selected from iron, nickel, cobalt, and alloys of the foregoing. In some embodiments, the PCD table may further include thermally-stable diamond in which the metal-solvent catalyst or metallic infiltrant has been partially or substantially completely depleted from a selected surface or volume of the PCD table (e.g., to a selected depth from the bearing surface), such as via an acid leaching process. Thermally-stable PCD may also be sintered with one or more alkali metal catalysts. In some embodiments, the catalyst-depleted region may exhibit a depth that is substantially conformal with an outer surface of the PCD table. In other embodiments, the catalyst-depleted region may generally extend a desired depth from a plane extending through the uppermost portions of the table.

In some embodiments, PDCs which may be used as the bearing elements 106 may be formed in an HPHT process. For example, diamond particles may be disposed adjacent to the substrate and subjected to an HPHT process to sinter the diamond particles to form the PCD table and bond the PCD table to the substrate, thereby forming the PDC. The temperature of the HPHT process may be at least about 1000° C. (e.g., about 1200° C. to about 1600° C.) and the cell pressure, or the pressure in the pressure-transmitting medium (e.g., a refractory metal can, graphite structure, pyrophyllite, etc.), of the HPHT process may be at least 4.0 GPa (e.g., about 5.0 GPa to about 12 GPa or about 7.5 GPa to about 11 GPa) for a time sufficient to sinter the diamond particles.

In some embodiments, the diamond particles may exhibit an average particle size of about 50 µm or less, such as about 30 µm or less, about 20 µm or less, about 10 µm to about 20 µm, about 10 µm to about 18 µm, about 12 µm to about 18 µm, or about 15 µm to about 18 µm. In some embodiments, the average particle size of the diamond particles may be about 10 µm or less, such as about 2 µm to about 5 µm or submicron. In some embodiments, the diamond particles may exhibit multiple sizes and may comprise, for example, a relatively larger size and at least one relatively smaller size. As used herein, the phrases "relatively larger" and "relatively smaller" refer to particle sizes (by any suitable method) that differ by at least a factor of two (e.g., 30 µm and 15 µm). According to various embodiments, the mass of diamond particles may include a portion exhibiting a relatively larger size (e.g., 30 µm, 20 µm, 15 µm, 12 µm, 10 µm, 8 µm) and another portion exhibiting at least one relatively smaller size (e.g., 6 µm, 5 µm, 4 µm, 3 µm, 2 µm, 1 µm, 0.9 µm, 0.8 µm, 0.7 µm, 0.6 µm, 0.5 µm, less than 0.5 µm, 0.4 µm, 0.3 µm, 0.2 µm, 0.1 µm, less than 0.1 µm). For example, in one embodiment, the diamond particles may include a portion exhibiting a relatively larger size between about 10 µm and about 40 µm and another portion exhibiting a relatively smaller size between about 0.5 µm and 4 µm. In some embodiments, the diamond particles may comprise three or more different sizes (e.g., one relatively larger size and two or more relatively smaller sizes), without limitation. The PCD table so-formed after sintering may exhibit an average diamond grain size that is the same or similar to any of the foregoing diamond particle sizes and distributions. More details about diamond particle sizes and diamond particle size distributions that may be employed are disclosed in U.S. Pat. No. 9,346,149, the disclosure of which is incorporated by reference herein in its entirety.

In some embodiments, the diamond grains of the resulting table may exhibit an average grain size that is equal to or less than approximately 12 µm and include cobalt content of greater than about 7 weight percent (wt. %) cobalt. In some other embodiments, the diamond grains of the resulting table may exhibit an average grain size that is equal to or greater than approximately 20 µm and include cobalt content of less than approximately 7 wt. %. In some embodiments, the diamond grains of the resulting table may exhibit an average grains size that is approximately 10 µm to approximately 20 µm.

In some embodiments, tables may comprise PCD sintered at a pressure of at least about 7.5 GPa, may exhibit a coercivity of 115 Oe or more, a high-degree of diamond-to-diamond bonding, a specific magnetic saturation of about 15 G·cm$^3$/g or less, and a metal-solvent catalyst content of about 7.5 wt. % or less. The PCD may include a plurality of diamond grains directly bonded together via diamond-to-diamond bonding to define a plurality of interstitial regions. At least a portion of the interstitial regions or, in some embodiments, substantially all of the interstitial regions may be occupied by a metal-solvent catalyst, such as iron, nickel, cobalt, or alloys of any of the foregoing metals. For example, the metal-solvent catalyst may be a cobalt-based material including at least 50 wt. % cobalt, such as a cobalt alloy.

The metal-solvent catalyst that occupies the interstitial regions may be present in the PCD in an amount of about 7.5 wt. % or less. In some embodiments, the metal-solvent catalyst may be present in the PCD in an amount of about 3 wt. % to about 7.5 wt. %, such as about 3 wt. % to about 6 wt. %. In other embodiments, the metal-solvent catalyst content may be present in the PCD in an amount less than about 3 wt. %, such as about 1 wt. % to about 3 wt. % or a residual amount to about 1 wt. %. By maintaining the metal-solvent catalyst content below about 7.5 wt. %, the PCD may exhibit a desirable level of thermal stability.

Generally, as the sintering pressure that is used to form the PCD increases, the coercivity may increase and the magnetic saturation may decrease. The PCD defined collectively by the bonded diamond grains and the metal-solvent catalyst may exhibit a coercivity of about 115 Oe or more and a metal-solvent catalyst content of less than about 7.5 wt. % as indicated by a specific magnetic saturation of about 15 G·cm$^3$/g or less. In a more detailed embodiment, the coercivity of the PCD may be about 115 Oe to about 250 Oe and the specific magnetic saturation of the PCD may be greater than 0 G·cm3/g to about 15 G·cm$^3$/g. In an even more detailed embodiment, the coercivity of the PCD may be about 115 Oe to about 175 Oe and the specific magnetic saturation of the PCD may be about 5 G·cm$^3$/g to about 15 G·cm$^3$/g. In yet an even more detailed embodiment, the coercivity of the PCD may be about 155 Oe to about 175 Oe and the specific magnetic saturation of the PCD may be about 10 G·cm$^3$/g to about 15 G·cm$^3$/g. The specific permeability (i.e., the ratio of specific magnetic saturation to coercivity) of the PCD may be about 0.10 or less, such as about 0.060 to about 0.090. Despite the average grain size of the bonded diamond grains being less than about 30 µm, the metal-solvent catalyst content in the PCD may be less than about 7.5 wt. % resulting in a desirable thermal stability.

In one embodiment, diamond particles having an average particle size of about 18 µm to about 20 µm are positioned adjacent to a cobalt-cemented tungsten carbide substrate and subjected to an HPHT process at a temperature of about 1390° C. to about 1430° C. and a cell pressure of about 7.8 GPa to about 8.5 GPa. The PCD so-formed as a PCD table bonded to the substrate may exhibit a coercivity of about 155 Oe to about 175 Oe, a specific magnetic saturation of about 10 G·cm$^3$/g to about 15 G·cm$^3$/g, and a cobalt content of about 5 wt. % to about 7.5 wt. %.

In one or more embodiments, a specific magnetic saturation constant for the metal-solvent catalyst in the PCD may be about 185 G·cm$^3$/g to about 215 G·cm$^3$/g. For example, the specific magnetic saturation constant for the metal-solvent catalyst in the PCD may be about 195 G·cm$^3$/g to about 205 G·cm$^3$/g. It is noted that the specific magnetic saturation constant for the metal-solvent catalyst in the PCD may be composition dependent.

Generally, as the sintering pressure is increased above 7.5 GPa, a wear resistance of the PCD so-formed may increase. For example, the Gratio may be at least about $4.0 \times 10^6$, such as about $5.0 \times 10^6$ to about $15.0 \times 10^6$ or, more particularly, about $8.0 \times 10^6$ to about $15.0 \times 10^6$. In some embodiments, the Gratio may be at least about $30.0 \times 10^6$. The Gratio is the ratio of the volume of workpiece cut (e.g., between about 470 in$^3$ of barre granite to about 940 in$^3$ of barre granite) to the volume of PCD worn away during the cutting process.

The material characteristics discussed herein, as well as other characteristics that may be provided in a bearing element 106, including processes for measuring and determining such characteristics, as well as methods of making such bearing elements, are described in U.S. Pat. Nos. 7,866,418, 8,297,382, and 9,315,881, the disclosure of each of which is incorporated by reference herein in its entirety.

In some embodiments, the table may comprise high density polycrystalline diamond. For example, in some embodiments, the table may comprise approximately 95 percent diamond by volume (vol. %) or greater. In some embodiments, the table 170 may comprise approximately 98 vol. % diamond or greater. In some embodiments, the table 170 may comprise approximately 99 vol. % diamond or greater. In other embodiments, the table may comprise polycrystalline diamond or relatively low diamond content. For example, in some embodiments, the table may comprise less than 95 percent diamond by volume (vol. %).

In some embodiments, the table may be integrally formed with the substrate such as discussed above. In some other embodiments, the table may be a pre-formed table that has been HPHT bonded to the substrate in a second HPHT process after being initially formed in a first HPHT process. For example, the table may be a pre-formed PCD table that has been leached to substantially completely remove the metal-solvent catalyst used in the manufacture thereof and subsequently HPHT bonded or brazed to the substrate in a separate process.

The substrate may be formed from any number of different materials, and may be integrally formed with, or otherwise bonded or connected to, the table. Materials suitable for the substrate may include, without limitation, cemented carbides, such as tungsten carbide, titanium carbide, chromium carbide, niobium carbide, tantalum carbide, vanadium carbide, or combinations thereof cemented with iron, nickel, cobalt, or alloys thereof.

As discussed above, in some embodiments, the table may be leached to deplete a metal-solvent catalyst or a metallic infiltrant therefrom in order to enhance the thermal stability of the table. For example, when the table is a PCD table, the table may be leached to remove at least a portion of the metal-solvent catalyst, that was used to initially sinter the diamond grains to form a leached thermally-stable region from a working region thereof (e.g., the bearing surface) to a selected depth. The leached thermally-stable region may extend inwardly from the working surface to a selected depth. In some embodiments, the entire table may be leached such that it is substantially completely devoid of metal-solvent catalyst material. The leaching may be performed in a suitable acid, such as aqua regia, nitric acid, hydrofluoric acid, or mixtures of the foregoing.

Referring still to FIGS. 1 and 2, the carrier component 104 may be configured to mate with an opening formed in the ring 102 such that it is fixed, relative to the ring 102, in at least a radial direction (i.e., a direction extending radially from a radial center-point 112, or an axis of rotation, of the bearing assembly 100). The carrier 104 may be configured to exhibit a desired shape for coupling with the ring 102. For example, in the embodiment shown in FIGS. 1 and 2, the carrier 104 is configured generally as an annulus sector having an inner radial surface 120 (to which the bearing elements 106 are mounted or in which they are inserted), an outer radial surface 122, and angular circumferential ends 124. A similarly shaped opening 125 may be formed in the bearing ring 102 for receipt of the carrier component 104. For example, the carrier component 104 may slide in a direction parallel to the bearing's rotational axis 126 into the opening 125 and then secured within the opening 125 by any of a variety of methods including, for example, the use of one or more fasteners 128 extending through the ring 102 and engaging the carrier component 104. Of course, other types of securing techniques may be employed. However, in the embodiment shown in FIGS. 1 and 2, it may be desirable that the carrier components 104 are removable from the ring, such as by a service man or a field technician, with relative ease.

Figure 3:
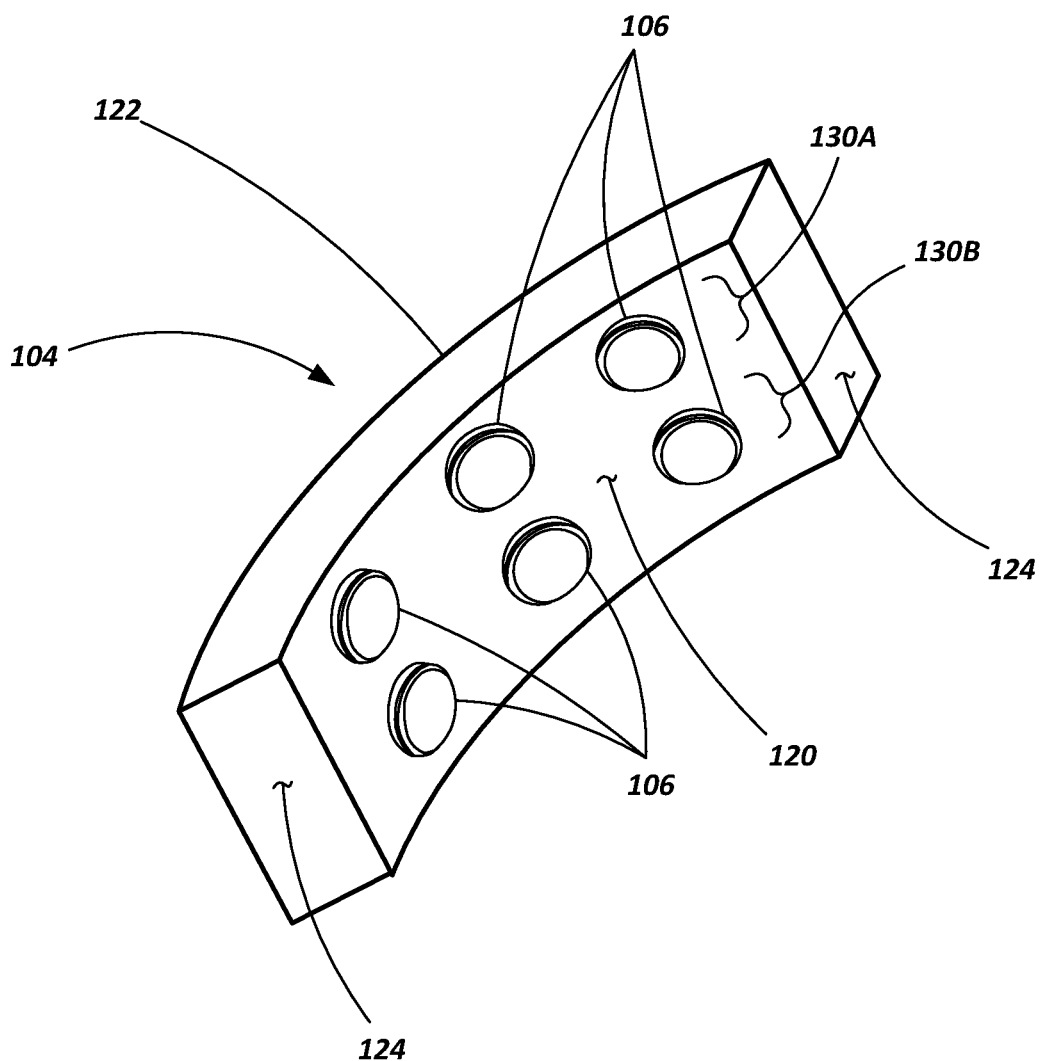
FIG. 3 shows a pair of radial bearing assemblies with a carrier component being removed from one assembly and installed in a second assembly.

In FIGS. 1 and 2, the carrier 104 is depicted as having two separate bearing elements 106 coupled therewith. However, it will be appreciated that a single bearing element may be coupled with each carrier component 104, or that additional bearing elements may be coupled with the carrier component 104. For example, as seen in FIG. 3, a carrier component 104 may include multiple bearing elements 106 arranged in multiple, circumferential rows (e.g., rows 130A and 130B). In some embodiments, the bearing elements 106 may be aligned with one another as shown in FIG. 3. In other embodiments, the bearing elements 106 in one row may be circumferentially staggered relative to bearing elements 106 of another row.

Figure 4:
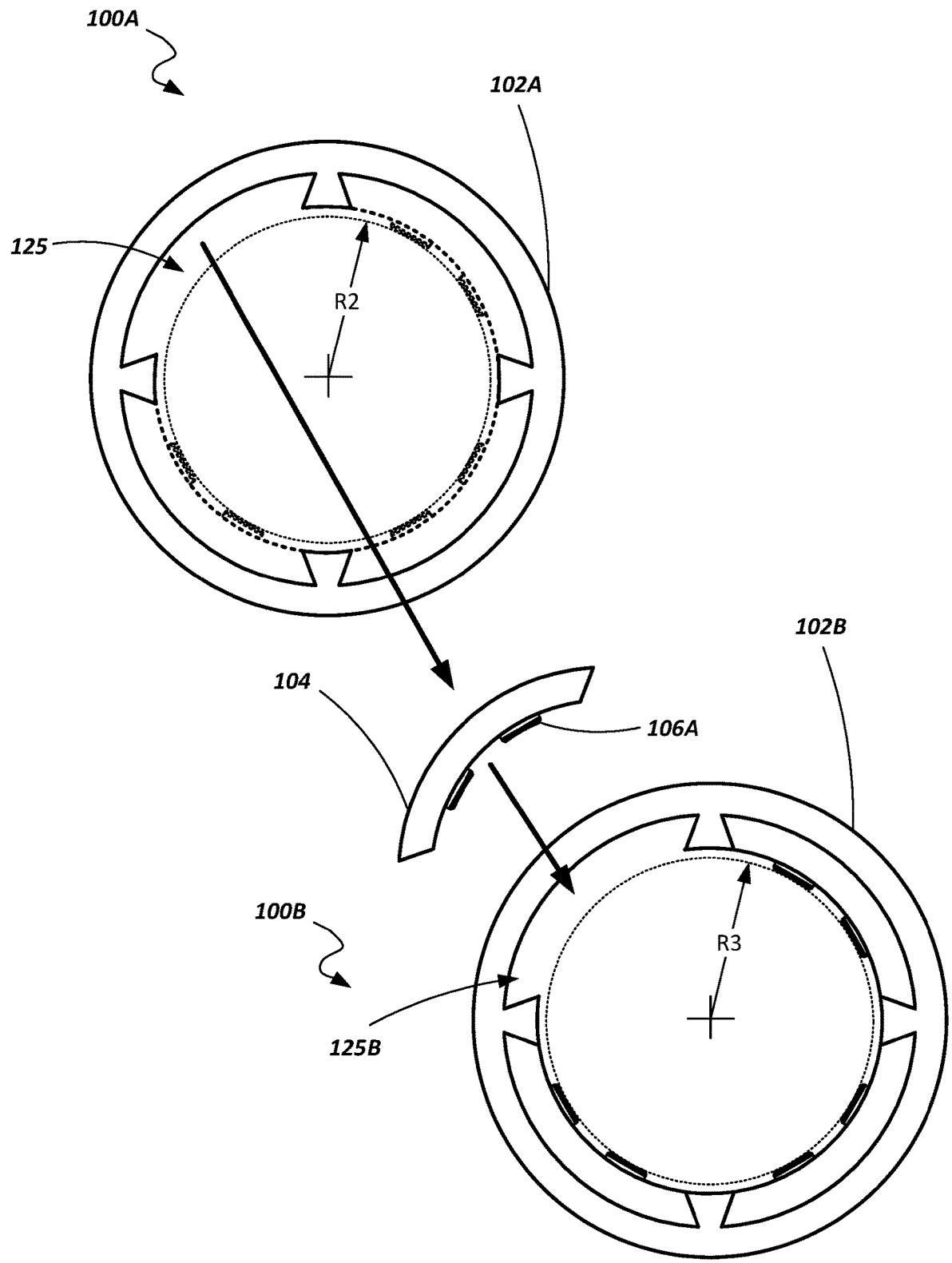
FIG. 4 shows a perspective view of a carrier component for use in a bearing assembly according to another embodiment of the present disclosure.

Referring to FIG. 4, a first bearing assembly 100A is shown which has been in service and wherein the bearing elements 106A have experienced sufficient wear that a gap has developed (e.g., between the bearing elements 106A and a shaft or an inner bearing race) such that the radius R2 of the bearing surface, substantially at which the individual bearing surfaces of the bearing elements 106A are positioned, is enlarged relative to the original radius (e.g., R1) and is unacceptable in terms of tolerance or specification for a specific case. In some cases, the developed gap may additionally be due to wear of the shaft or the elements of an inner bearing race. However, the bearing elements 106A may still have tables with sufficient thickness so as to provide further service life. Thus, rather than simply replace the entire bearing assembly 100A with a new assembly, FIG. 4 shows that the carrier components 104, along with the partially worn bearing elements 106A, may be removed from the bearing ring 102A and placed in a new bearing ring 102B.

As seen in FIG. 4, the new bearing ring 102B may be configured substantially similar to that of the first bearing ring 102A, except that the openings 125B are configured such that when the carrier components are all assembled with, and secured to, the bearing ring 102B, each bearing surface (e.g., a radially innermost portion) is positioned substantially at radius R3, with R3 being different (e.g., smaller than) R2. In one embodiment, R3 may be substantially equal to the original radius R1 (see FIG. 2). In other embodiments, R3 may be smaller than R1 in order to additionally compensate for any wear of a mating component (e.g., in a shaft or the bearing surface of an inner bearing race). Thus, in one embodiment, the openings 125B of the rings 102B may be configured such that R3 is equal to or less than the radius of the bearing surface of original bearing assembly (e.g., bearing assembly 100) prior to any wear of the bearing elements 106. In other words, placing the carrier components 104 with the partially worn bearing elements 106A in a new ring 102B provides a bearing assembly that is within tolerance, or within specification, with regard to the positioning of the bearing surface of the original bearing assembly 100 relative to its mating component. Depending on the thickness of the tables of the bearing elements 106, and the specifications of a particular machine or apparatus employing a radial bearing assembly 100, the carrier components 104 may be removed from the second bearing ring 102B after a specified amount of wear in the bearing elements 106 and then placed in yet another bearing ring, positioning the bearing elements 106 so as to define a bearing surface that is again substantially within operating tolerance. It is noted that the operating tolerance may be defined, at least partially, by an allowable gap between the bearing surface of the bearing elements 106 and an associated bearing surface (e.g., a shaft or a bearing surface of an inner bearing race).

In some embodiments, a kit may be provided in association with an apparatus that employs a radial bearing, the kit including an original bearing assembly (e.g., bearing assembly 100 shown in FIGS. 1 and 2), along with one or more bearing rings (e.g., ring 102B and/or additional bearing rings) that enables maintenance personnel to remove the carrier components from a first ring, install them in a second (or third, etc.) ring, and continue to keep the bearing elements 106 in service until, for example, their tables have reached a specified minimum thickness.

The bearing assembly 100 may be configured with different numbers of carrier components than depicted in FIGS. 1 and 2. For example, the bearing assembly 100 may include two carrier components that each extend substantially half way around the circumference of the bearing ring 102. Thus, in some embodiments, there may be as few as two carrier components 104, and in some embodiments, there may be as many as eight, or ten, or even more carrier components, depending, for example, on the size of the bearing assembly, the anticipated service of the bearing assembly, and anticipated wear of the various bearing elements 106. Additionally, as previously noted, each carrier component may include more or fewer bearing elements than is depicted in FIGS. 1 and 2, and may include multiple rows of bearing elements 106. Further, the bearing elements, while depicted as substantially cylindrical members, the bearing elements 106 may exhibit a variety of geometries as will be appreciated by those of ordinary skill in the art. Likewise, the carrier components 104 may exhibit different shapes or geometries, and interlock or interface with the bearing ring 102 in a manner different from that which is shown in FIGS. 1, 2 and 4.

Figure 5:
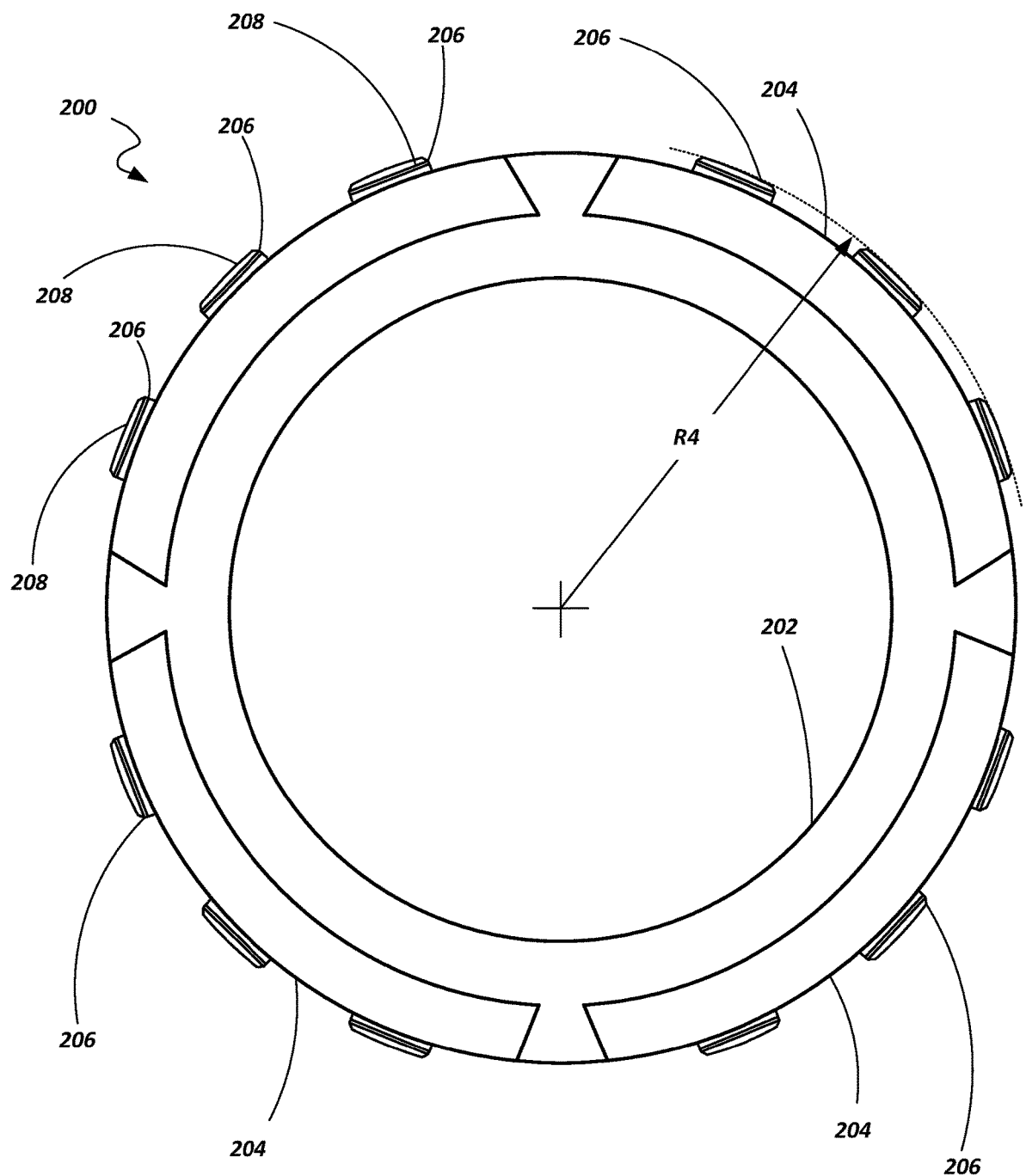
FIG. 5 shows a front view of a bearing assembly according to another embodiment of the present disclosure.

Referring briefly to FIG. 5, another bearing assembly 200 is shown. The bearing assembly 200 is generally configured with similar features as the assembly 100 shown in FIGS. 1 and 2, except that the bearing assembly 200 is configured as an "inner" bearing assembly. The bearing assembly 200 includes a bearing ring 202 having a plurality of carrier components 204 mounted thereto. Each carrier component 204 may include one or more bearing elements 206 mounted in the carrier component 204. For example, the bearing elements 206 may be disposed within a pocket formed in the carrier element 204 such as by brazing, by press fit, by way of adhesive, by way of mechanical fasteners, or by way of other mechanical fastening or material joining techniques. The bearing assembly 200 shown in FIG. 5 includes bearing surfaces positioned substantially at a specified radius R4 (as collectively defined by the individual bearing surfaces 208 of the bearing elements 206, the bearing surface being the radially outermost surface of the assembly 200. In some embodiments, each of the bearing elements 206 may exhibit a convex bearing surface 208.

In one embodiment the bearing ring 202 may comprise of a metal material (e.g., steel or stainless steel). Similarly, the carrier component 204 may comprise of a metal material. In some embodiments, the bearing elements 206 may comprise one or more superhard, superabrasive material. For example, the bearing elements 206 may include polycrystalline cubic boron nitride, polycrystalline diamond or other superabrasive materials. In some embodiments, the bearing elements 206 may include a superhard, superabrasive table defining a bearing surface 208 of the bearing element 206. In some embodiments, the bearing element 206 may comprise a polycrystalline diamond compact ("PDC") including a polycrystalline diamond ("PCD") table to which a substrate is bonded such as has been described hereinabove.

The bearing assembly 200 may be employed to adjust or reduce a gap that develops due to wear of bearing elements 206 and/or 106 (as described above with respect to the outer bearing assembly 100 depicted in FIGS. 1 and 2). For example, when the bearing elements 206 wear beyond a specified amount, increasing a gap between the bearing surface and another bearing surface (e.g., bearing elements 106 of an outer bearing assembly 100 or other component), the carriers 204 may be removed from the ring 202 and placed in a new bearing ring (not shown) to reestablish a desired positional relationship of the bearing elements 206 relative to an associated bearing surface (e.g., to reestablish a selected gap between such bearing surfaces). Thus, in one embodiment, the radial outermost surfaces of the bearing elements 206 may be repositioned to be substantially at R4. In another embodiment, the radial outermost surfaces of the bearing elements 206 may be positioned substantially at a different radius, including a radius that is greater than R4.

Figure 6:
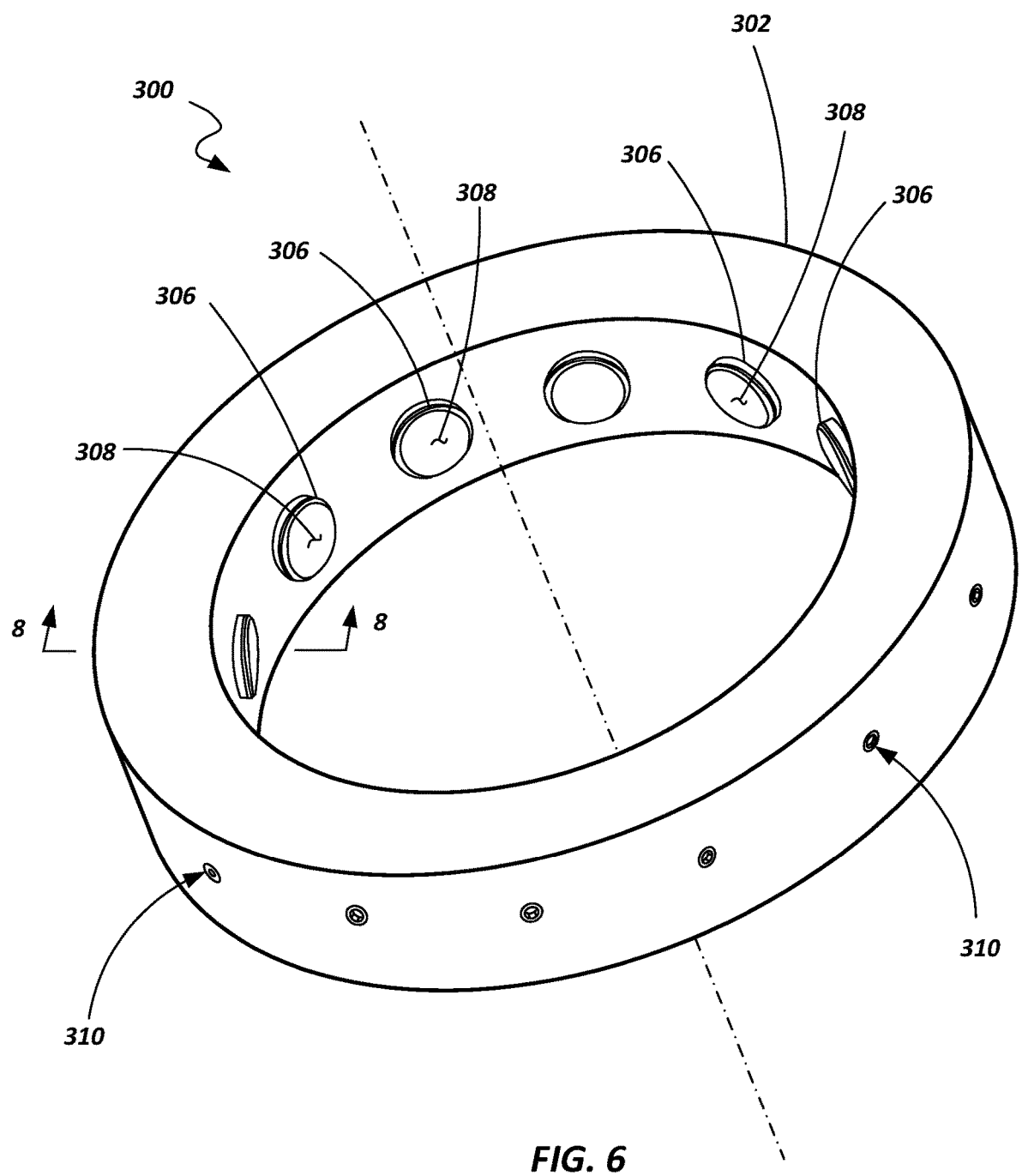
FIG. 6 shows a perspective view of a radial bearing assembly according to another embodiment of the present disclosure.
Figure 7:
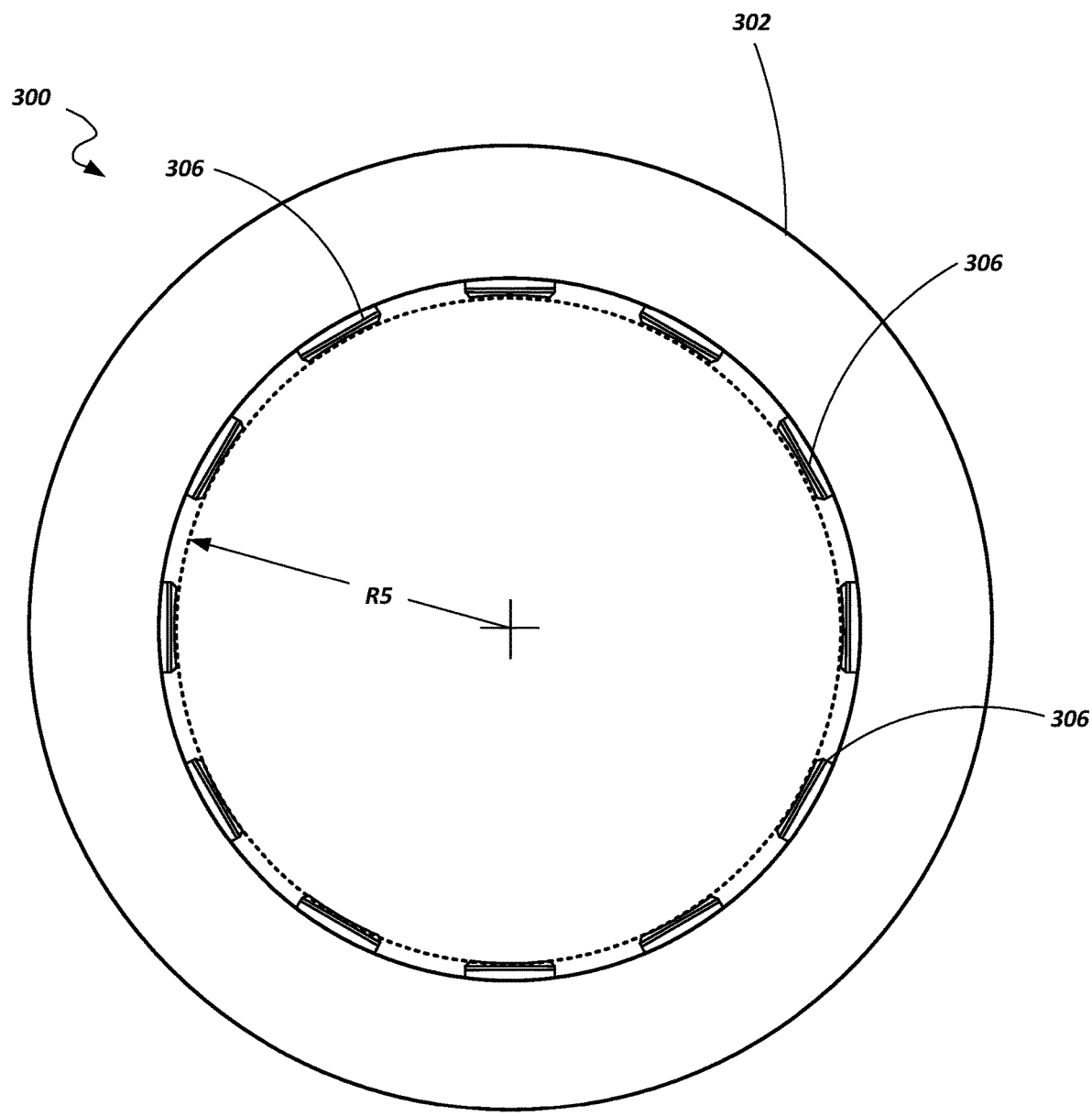
FIG. 7 shows a front view of the bearing assembly shown in FIG. 6.

Referring now to FIGS. 6 and 7, another embodiment of a bearing assembly 300 is shown. The bearing assembly 300 includes a bearing ring 302 and a plurality of bearing elements 306 disposed in pockets formed in a radial inner surface of the bearing ring 302. In one embodiment the bearing ring 302 may comprise a metal material (e.g., steel or stainless steel). In some embodiments, the bearing elements 306 may be formed of superhard, superabrasive materials. For example, the bearing elements 306 may comprise polycrystalline cubic boron nitride, polycrystalline diamond or other superabrasive materials. In some embodiments, each bearing element 306 may include a superhard, superabrasive table defining a bearing surface 308 of the bearing element 306. In some embodiments, the bearing element 306 may comprise a polycrystalline diamond compact ("PDC") including a polycrystalline diamond ("PCD") table to which a substrate is bonded such as has been described hereinabove. The bearing elements 306 may be configured such that the unworn individual bearing surfaces 308 substantially define or substantially exhibit a desired radius R5.

Figure 8:
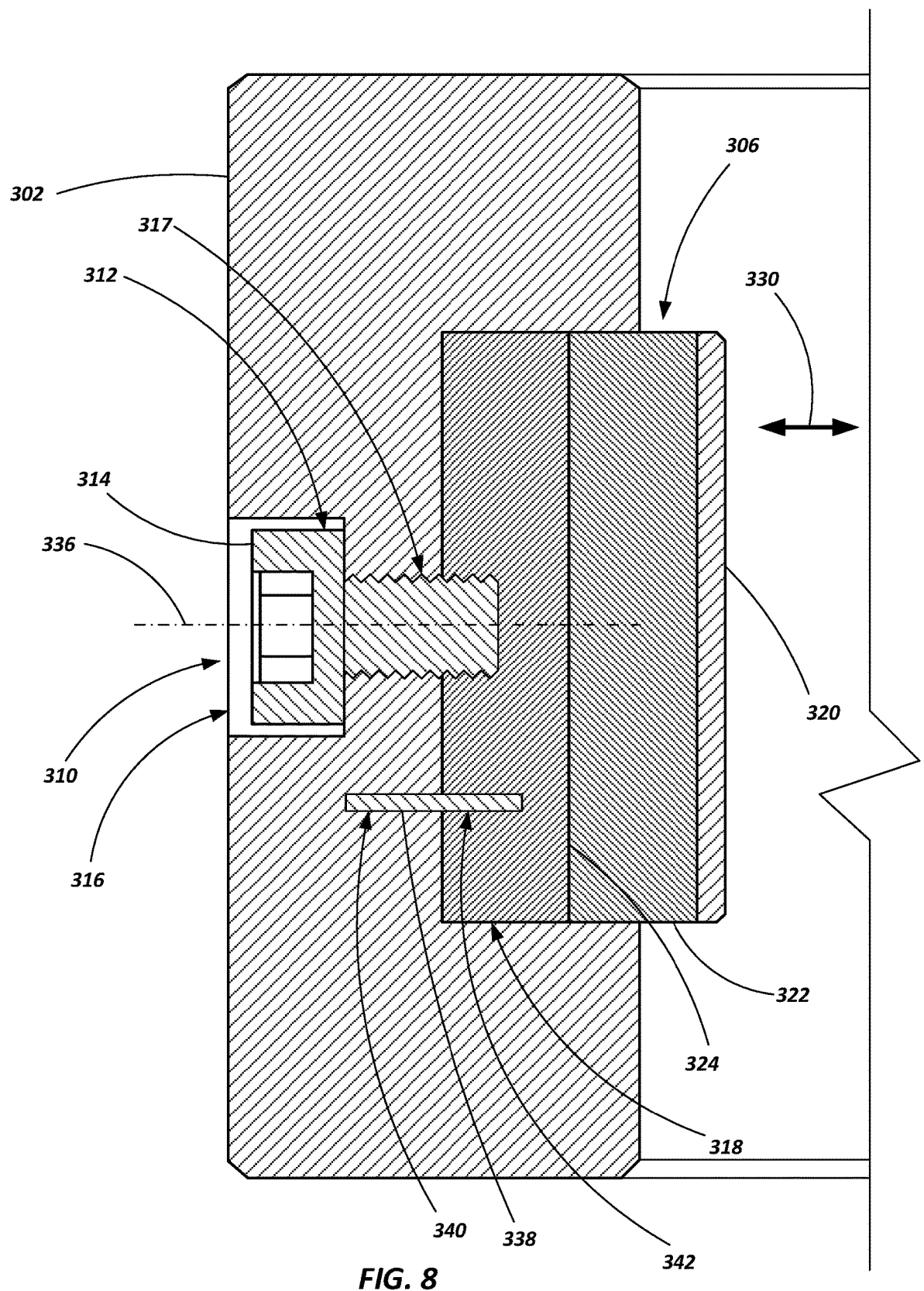
FIG. 8 shows a cross-sectional view of the bearing assembly shown in FIG. 7 according to the section lines 8-8.
Figure 9:
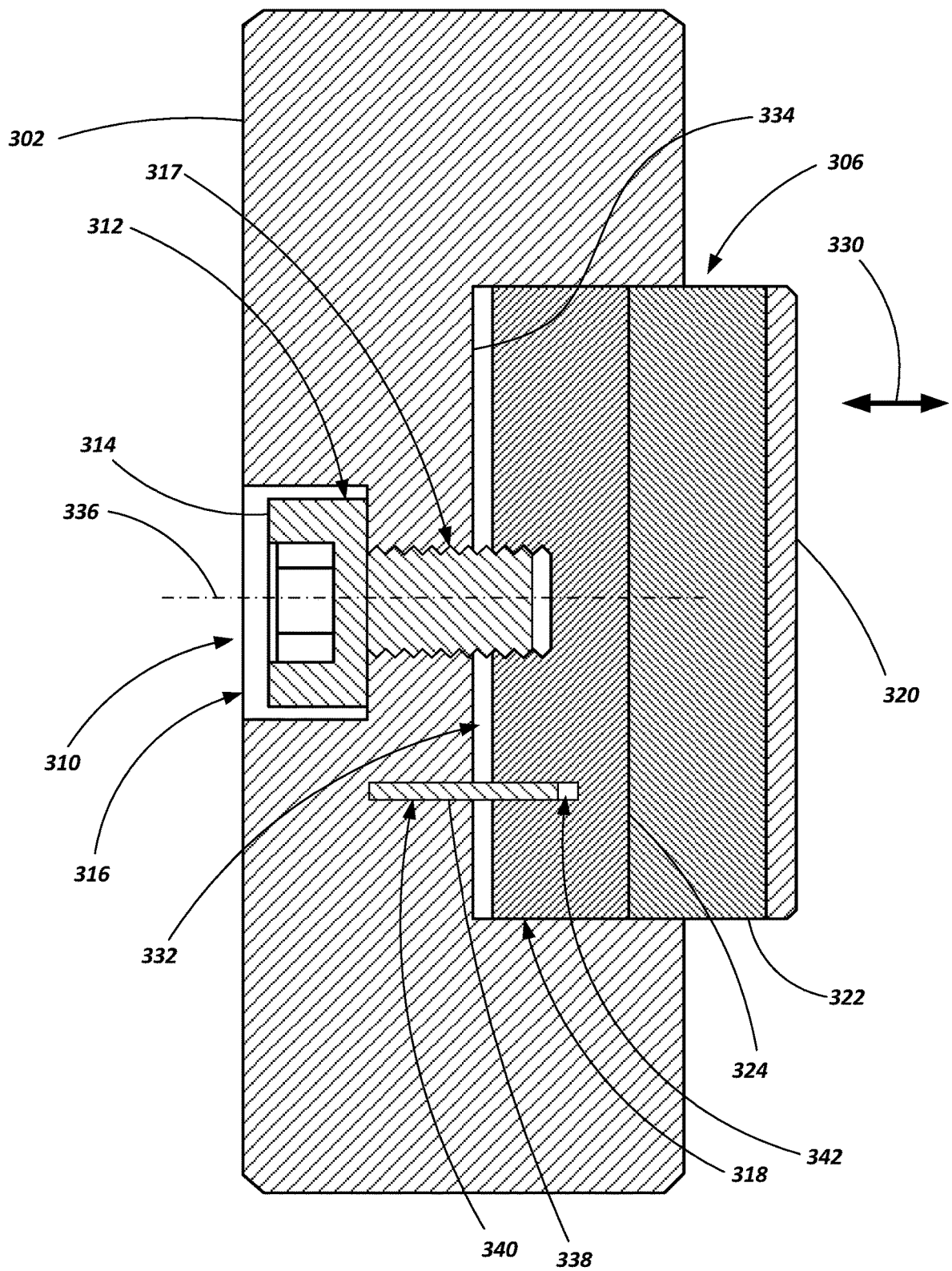
FIG. 9 shows a cross-sectional view of the bearing assembly depicted in FIG. 8 after a radial adjustment of a bearing element.

The bearing elements 306 may be coupled with an adjustment mechanism 310 configured to radially adjust one or more of the bearing elements 306 (towards or away from a rotational axis) relative to the bearing ring 302, altering the radial position of the bearing surface 308 of one or more of the bearing element 306s. For example, as shown in FIGS. 8 and 9, the adjustment mechanism 310 may include a threaded fastener 312 that is threadably coupled with the bearing ring 302 and also threadably coupled with an associated bearing element 306. The fastener 312 may include a head 314 (e.g., an Allen or Torx type head) disposed within a counter-bored region 316 and a threaded body extending through a threaded opening 317 and into a pocket 318 formed within the bearing ring 302 for engagement with the bearing element 306.

As seen in FIG. 8, the bearing element 306 may include a table 320, a substrate 322 and a base member 324 coupled with the substrate. The base member 324 may include, for example, a metal material (e.g., steel) that is brazed or otherwise joined to the substrate 322. A threaded opening may be formed in the base 324 to receive the fastener 312. The fastener 312 and bearing element 306 may be cooperatively adjusted to move the bearing element 306 in a radial direction, indicated by direction arrow 330, relative to the bearing ring 302. As shown in FIG. 9, a space 332 may be present between the bearing element 306 and a floor 334 of the pocket 318 in the bearing ring 302 as compared to FIG. 8, indicating the radial displacement or repositioning of the bearing element 306 relative to the bearing ring 302.

In various embodiments, one or more anti-rotation features may be provided to inhibit rotation of the bearing element 306 relative to the bearing ring 302 about an associated longitudinal axis 336 (e.g., that extends through the fastener 312 and the bearing element 306). For example, in one embodiment, a pin member 338 may be disposed in a channel 340 formed in the bearing ring 302 and in a corresponding channel 342 formed in the bearing element 306 (e.g., in the base 324). The pin member 338 enables the bearing element 306 to be displaced radially (e.g., along the axis 336) without rotating about the axis 336 relative to the bearing ring 302. In other embodiments, other types of anti-rotation features or mechanisms may be employed, including the use of nonsymmetrical geometries in the bearing element 306 (e.g., a non-cylindrically shaped bearing element, an abutment shoulder or keyed feature) and corresponding or mating features formed in the associated pocket 318 of the bearing ring 302.

Thus, the adjustment mechanism 310 may be used to place the bearing surface 308 of one or more bearing elements 306 substantially at a specified radial position (e.g., substantially at radius R5). Such an adjustment may take place after wear of the bearing element 306 creates an undesirable radial clearance or gap, so as to place the bearing assembly back within a desired tolerance or specification (e.g., a selected gap), extending the service life of the bearing elements 306. In other embodiments, adjustment of the bearing elements 306 may be employed to place the bearing assembly 300 within a desired tolerance for a given application or use of the bearing assembly 300.

Figure 10:
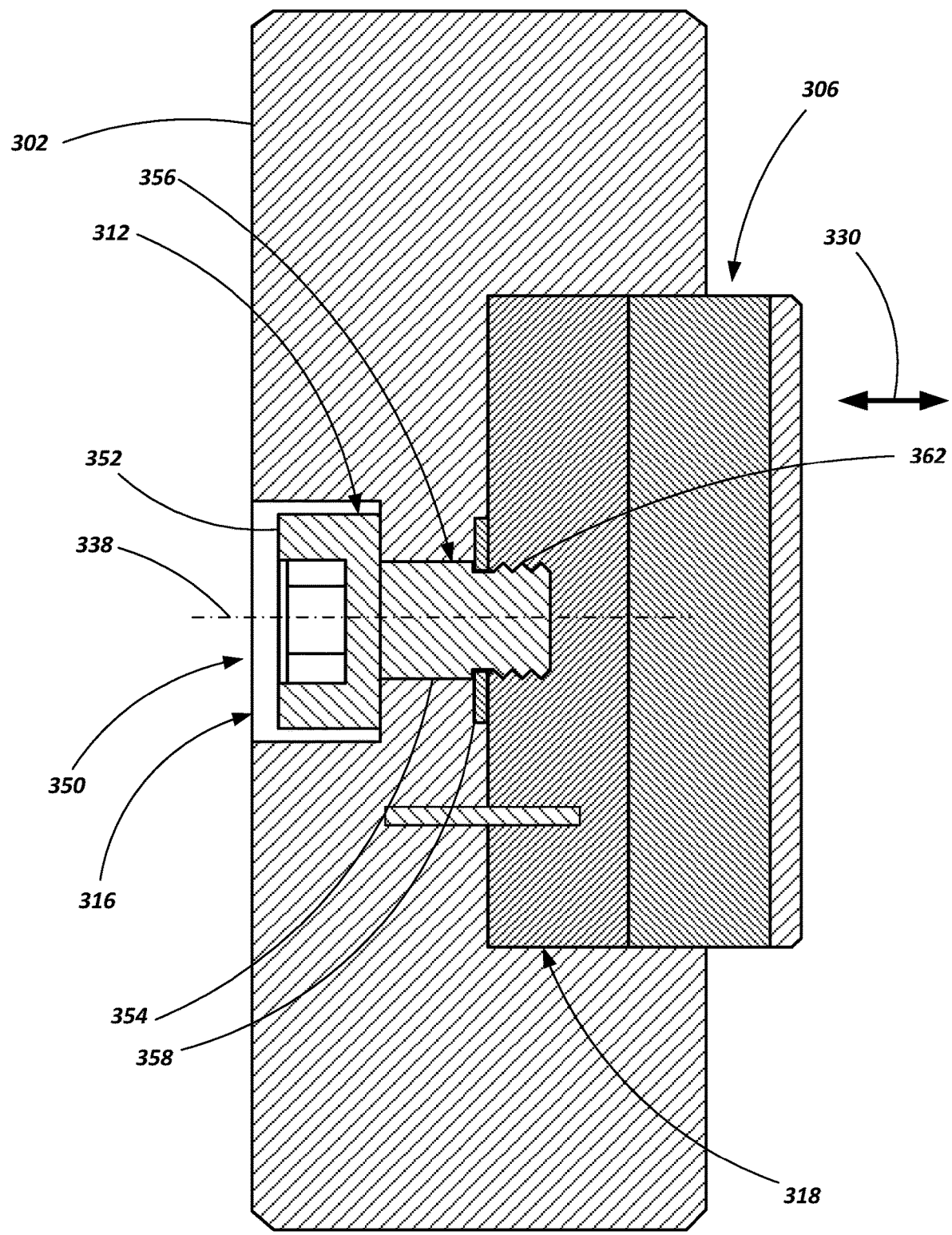
FIG. 10 shows a cross-sectional view of the bearing assembly shown in FIG. 7 according to the section lines 8-8 in accordance with another embodiment.

Referring to FIG. 10, another adjustment mechanism 350 is shown which includes a fastener 352 having a non-threaded shank portion 354 extending through an opening 356 and into the pocket 318 formed in the bearing ring 302. A retainer 358 is coupled to the fastener 352 to hold the fastener from moving in a radial direction 330 while allowing it to rotate about its longitudinal axis 360. The fastener includes a threaded shank portion 362 that is coupled with the bearing element 306. Thus, when the fastener 352 is rotated about its longitudinal axis 360, it remains in its radial position relative to the bearing ring 302, causing the bearing element 306 to be displaced in a radial direction 330 relative to the bearing ring 302 (e.g., in or out of the pocket 318). As has been described with respect to other embodiments, a pin 362 and/or other anti-rotation features or mechanisms may be employed to inhibit rotation of the bearing element 306 about the axis 360 relative to the bearing ring 302 during radial adjustment of the bearing element 306. Of course other adjustment mechanisms may be utilized to facilitate the radial displacement of the bearing elements relative to a bearing ring.

While the adjustment mechanisms are shown in connection with an "outer" bearing assembly (such as shown in FIGS. 6 and 7), it is noted that such an assembly may similarly be used with an "inner" bearing assembly where the bearing elements are positioned about an outer circumference of a bearing ring (similarly to the bearing assembly 200 shown in FIG. 5).

Further, it is noted that various embodiments described herein may be combined to provide a bearing apparatus used in various types of machinery. For example, an outer bearing assembly (such as shown in FIGS. 1 and 2) may be combined with an inner bearing assembly (such as shown in FIG. 5), with one or more bearing elements of one assembly contacting one or more bearing elements of the other associated assembly in a rotatably sliding fashion to provide a radial bearing apparatus.

In one embodiment, adjustment mechanisms (e.g., 310 or 350) may be combined with, or implemented into, a carrier component (e.g., 104, 204). In other words, considering FIGS. 8-9, rather than being installed in a bearing ring 302, the adjustment mechanism(s) 310, 350 may be positioned within a carrier component 104, 204 (see FIGS. 1-5). Thus, multiple levels of adjustment may be accomplished by providing multiple ways of adjusting the radial bearing surface in a given bearing ring.

In yet other embodiments, bearing elements may be fixed relative to a carrier component, and the carrier components (e.g., 104, 204) may be configured to be radially adjustable relative to a bearing ring using one or more adjustment mechanisms (e.g., 310, 350). Thus, multiple bearing elements may be adjusted relative to a bearing ring simultaneously by adjusting a single carrier component via the adjustment mechanism(s) 310, 350.

Figure 11:
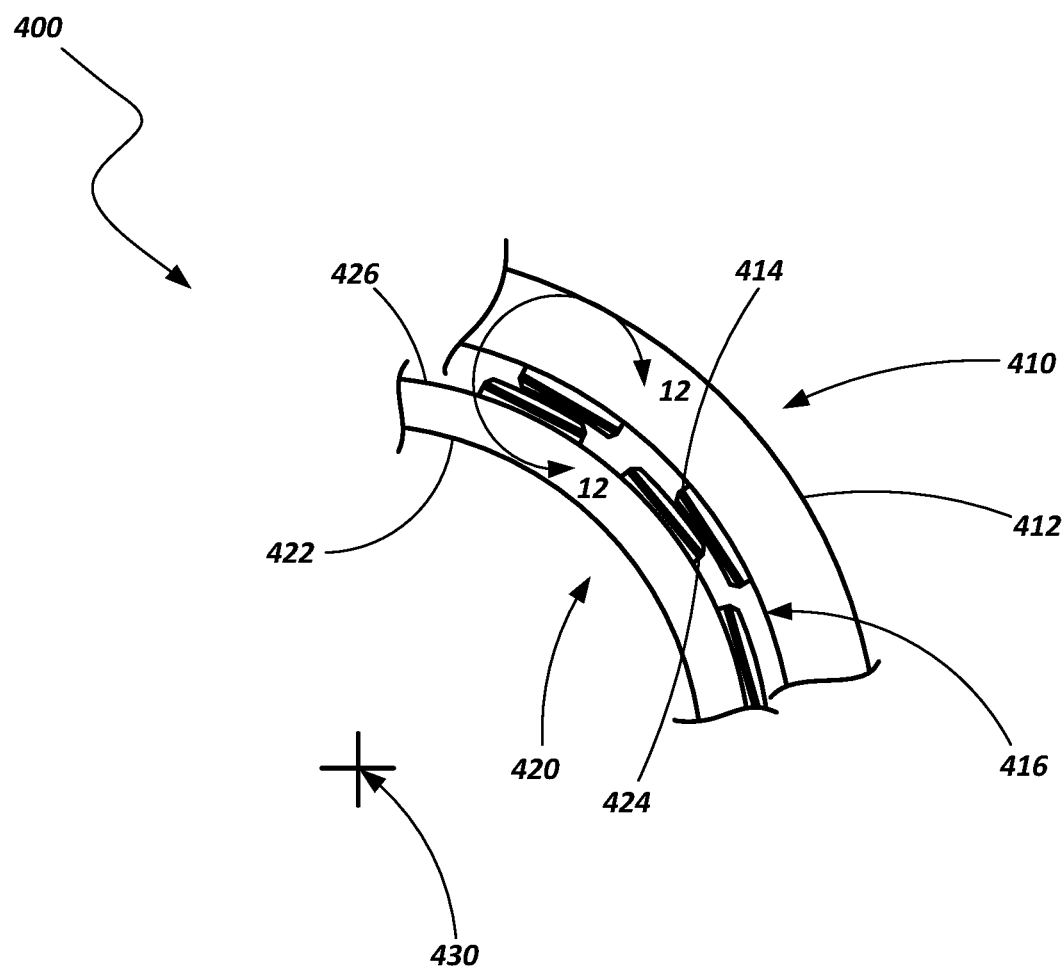
FIG. 11 shows a portion of a bearing apparatus in accordance with an embodiment of the present disclosure.

Referring to FIGS. 11-15, the radial adjustment of bearing elements according to various methods and embodiments of the present disclosure are shown. FIG. 11 depicts a portion of a bearing apparatus 400. The bearing apparatus 400 includes an outer radial bearing assembly 410 having a radial bearing ring 412 with a plurality of bearing elements 414 positioned along an inner surface or circumference 416 of the bearing ring 412. The bearing apparatus 400 further includes an inner radial bearing assembly 420 having a radial bearing ring 422 with a plurality of bearing elements 424 positioned along an outer surface or circumference 426 of the bearing ring 422. Each of the outer and inner radial bearing assemblies 410 and 420 are substantially positioned about a common radial center point 430 and are configured for rotation (relative to each other) about an axis extending through the center point 430. Thus, for example, the inner radial bearing assembly 420 may be in a fixed position while the outer radial bearing assembly 410 rotates, relative to the inner radial bearing assembly 420, about an axis extending through the center point 430. In another example, the opposite may be true with the outer radial bearing assembly 410 being fixed and the inner radial bearing assembly 420 rotating relative thereto. In yet other embodiments, both bearing assemblies 410, 420 may rotate, with one rotating at a different speed than the other, or with one rotating in a different direction than the other.

Figure 12:
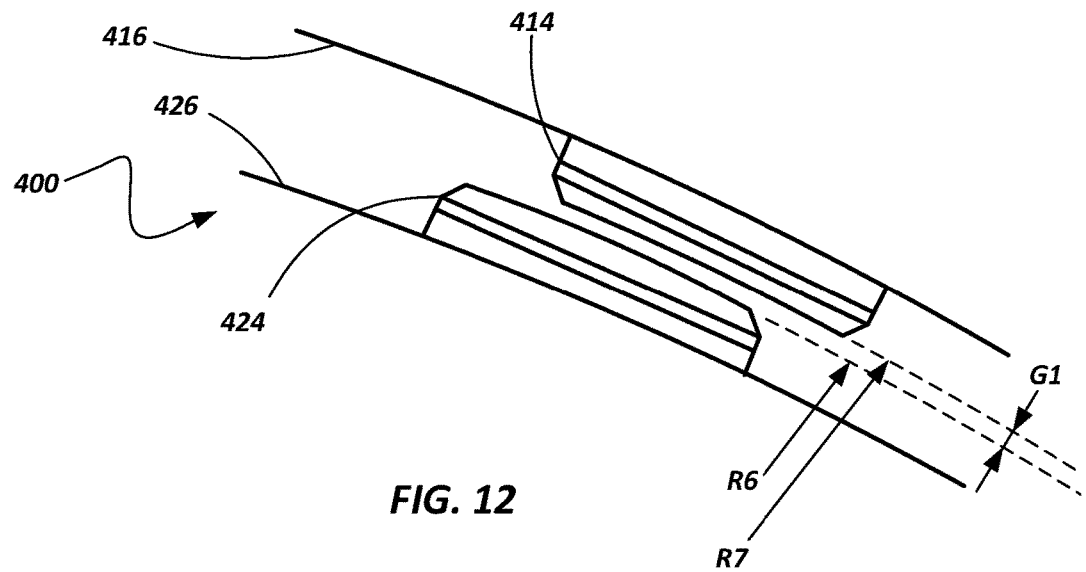
FIGS. 12-15 are enlarged details of a bearing apparatus as indicated by detail markings 12-12 shown in FIG. 11 indicating various stages of wear and/or adjustment.

As seen in FIG. 12, a detail is shown of the bearing apparatus 400 as indicated in FIG. 11. In some embodiments, at an initial stage of use (meaning that the bearing elements 414 and 424 are within initial specification and tolerance and have not experienced wear of any significance), there is an initial clearance gap G1 between the bearing element 414 of the outer radial bearing assembly 410 and the bearing element 424 of the inner radial bearing assembly 420. This gap G1 (e.g., an operating tolerance) may be, for example, between approximately 0.003 inch to approximately 0.006 inch depending, for example, on the size of the bearing apparatus and the application of the bearings. The gap G1 exists for various reasons including having sufficient clearance for assembly and/or alignment of the outer radial bearing apparatus 410 with the inner radial bearing apparatus 420.

Figure 13:
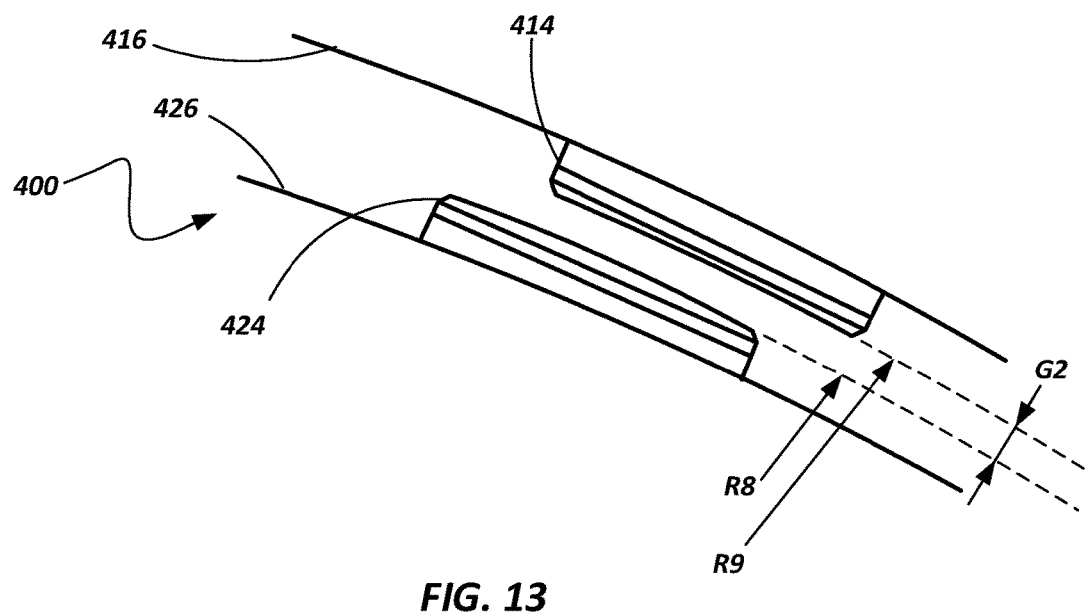

Referring to FIG. 13, the same detail is shown of the bearing apparatus 400 after significant wear of the bearing elements 414 and/or 424. For example, in some embodiments, it may be desirable to adjust the position of the bearing elements after one or both sets of bearing elements 414 and/or 424 exhibit a radial wear of 0.002 inch as compared to their original, unused or unworn condition. The wear of the bearing elements 414, 424 results in an enlarged gap G2. This enlarged gap G2 may be, for example, between approximately 0.008 inch and approximately 0.020 inch. In another embodiment, the enlarged gap G2 may be between approximately 0.020 inch and approximately 0.030 inch. In yet another embodiment, the enlarged gap may be as large as approximately 0.035 inch, 0.045 inch or greater. However, as the enlarged gap G2 grows, the performance of the bearing apparatus 400 generally decreases and adjustment of the bearing elements 414 and/or 424 may become desirable to reduce the gap using techniques or embodiments such as described hereinabove.

Figure 14:
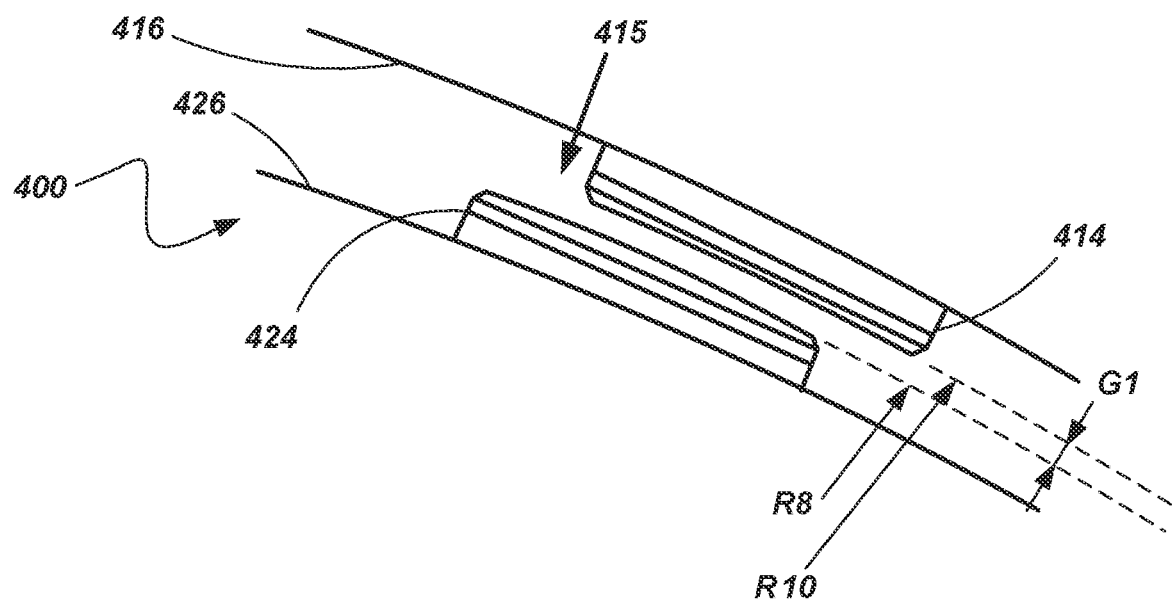
Figure 15:
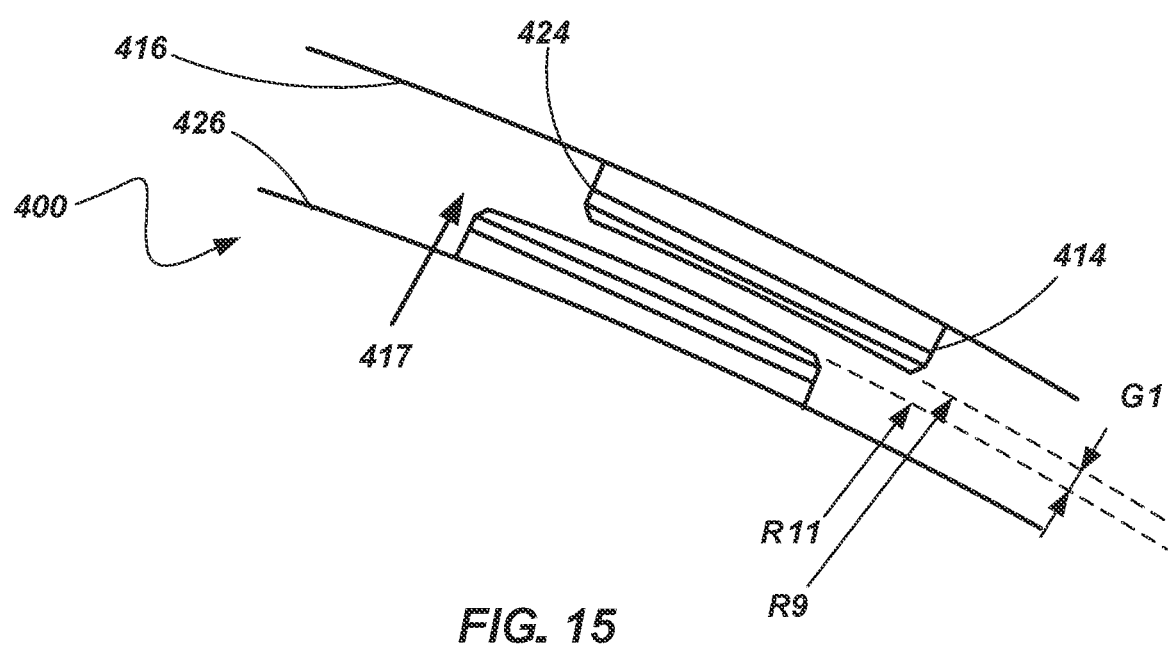

Thus, for example, with reference to FIG. 14, the bearing elements 414 of the outer radial bearing assembly 410 may be adjusted radially inward (e.g., in direction 415) until the gap between bearing elements 414, 424 is less than or approximately equal to the gap G1 of the initial specification (or to gap of another specified, acceptable magnitude). In another embodiment, with reference to FIG. 15, the bearing elements 424 of the inner radial bearing assembly 420 may be adjusted radially outward (e.g., in direction 417) until the gap between bearing elements 414, 424 is approximately equal to the gap G1 of the initial specification (or to gap of another specified, acceptable magnitude). In yet another embodiment, bearing elements 414 and 424 of both the inner and outer radial bearing assemblies 410, 420 may be adjusted (e.g., bearing elements 414 being adjusted radially inward and bearing elements 424 being adjusted radially outward) until a desired gap (e.g., gap G1) is achieved. These adjustment operations may be repeated as desired until an insufficient amount of bearing material (e.g., polycrystalline diamond) remains in the bearing elements 414, 424.

In addition to providing adjustment for a bearing apparatus after the specified amount of wear occurs in bearing elements (e.g., such as exhibited in FIG. 13), bearing elements of bearing assemblies may be adjusted during initial installation of a bearing apparatus (e.g., apparatus 400) in order to provide an apparatus with a reduced initial clearance gap. Thus, for example, after inner and outer bearing assemblies 410 and 420 are mated and assembled together to form the bearing apparatus 400, the bearing elements 414 and/or 424 may be adjusted from a first clearance gap (which might be, for example, between 0.003 inch and 0.008 inch) to a smaller clearance gap. In one embodiment, the clearance gap may be reduced to, for example, 0.0005 inch, or they gap may even be eliminated from the assembly. Thus, in some embodiments, the initial operating gap G1 (see FIG. 14) may actually be substantially eliminated, or at least substantially reduced (e.g., to approximately 0.0005 inch).

While certain embodiments and details have been included herein for purposes of illustrating aspects of the instant disclosure, it will be apparent to those skilled in the art that various changes in the systems, apparatuses, and methods disclosed herein may be made without departing from the scope of the instant disclosure, which is defined, in part, in the appended claims. The words "including" and "having," as used herein including the claims, shall have the same meaning as the word "comprising." Additionally, it should be noted that aspects, features or elements of a given embodiment may be combined with aspects, features or elements of other embodiments without limitation.

What is claimed is:

1. A radial bearing assembly, comprising:
   a bearing ring having a rotation axis, the bearing ring defining at least one pocket;
   a first carrier component configured to be removably coupled with the bearing ring in a fixed position relative to the bearing ring, the first carrier component disposed within the at least one pocket;
   at least a first bearing element including a first bearing surface, the at least a first bearing element fixed to the first carrier component, wherein the first carrier component is structured to position the first bearing surface of the at least a first bearing element at a fixed selected radial position relative to the rotational axis;

a second carrier component configured to be removably coupled with the bearing ring in a fixed positioned relative to the bearing ring;

at least a second bearing element including a second bearing surface, the at least a second bearing element fixed to the second carrier component, wherein the second carrier component is structured to position the second bearing surface of the at least a second bearing element at a different, fixed selected radial position relative to the rotational axis.

2. The radial bearing assembly of claim 1, wherein at least one of the first carrier component or the second carrier component is configured as an annulus sector.

3. The radial bearing assembly of claim 2, wherein the at least a first bearing element is disposed within a pocket formed in the first carrier component.

4. The radial bearing assembly of claim 2, wherein at least one of the first carrier component or the second carrier component is configured to be removable from the bearing ring by displacing the at least one of the first carrier component or the second carrier component in a direction that is parallel to an axis of rotation of the radial bearing assembly.

5. The radial bearing assembly of claim 1, wherein the at least a first bearing element includes a first plurality of bearing elements.

6. The radial bearing assembly of claim 5, wherein the first plurality of bearing elements are arranged in a plurality of circumferential rows.

7. The radial bearing assembly of claim 1, wherein the at least a first bearing element includes a polycrystalline diamond table bonded to a substrate.

8. The radial bearing assembly of claim 1, further comprising a fastener extending through the bearing ring and engaging the at least one carrier component.

9. The radial bearing assembly of claim 1, wherein a bearing surface of the at least a first bearing element exhibits a concave or a convex surface.

10. A radial bearing apparatus, comprising:
a bearing ring;
at least one bearing element coupled with the bearing ring and having a bearing surface; and
at least one adjustment mechanism configured to selectively adjust a radial position of all of the bearing surface of the at least one bearing element relative to the bearing ring, the at least one adjustment mechanism including a fastener and a retainer coupled to the fastener, the retainer configured to constrain radial displacement of the fastener relative to the bearing ring.

11. The radial bearing assembly of claim 10, wherein the fastener extends through a portion of the bearing ring and having a portion that is threadably engaged with the at least one bearing element.

12. The radial bearing assembly of claim 11, wherein the fastener includes a head disposed within a counterbore formed within the radial bearing.

13. The radial bearing assembly of claim 11, wherein the fastener is threadably coupled with the bearing ring.

14. A method of using a bearing, the method comprising:
providing a radial bearing assembly having a bearing ring, a plurality of carrier components coupled with the bearing ring, and a plurality of bearing elements including at least one bearing element coupled with each of the plurality of carrier components, the bearing ring defining at least one pocket and at least the first carrier component disposed within the at least one pocket, each of the plurality of bearing elements having a bearing surface, wherein the bearing surfaces of the bearing elements are positioned substantially at a selected radius;

wearing the plurality of bearing elements such that at least one of the bearing surfaces is positioned at a radius different from the selected radius;

removing the plurality of carrier components from the first bearing ring and coupling the plurality of carrier components to a second bearing ring such that the plurality of bearing elements are again positioned substantially at the selected radius.

15. The method according to claim 14, wherein wearing the plurality of bearing elements is configured to result in the bearing surface of at least one radius being positioned at a radius that is larger than the selected radius.

16. The method according to claim 14, wherein wearing the plurality of bearing elements is configured to result in the bearing surface of at least one radius being positioned at a radius that is smaller than the selected radius.

17. A method of using a bearing, the method comprising:
providing a radial bearing assembly having a bearing ring and a plurality of bearing elements coupled with the bearing ring, each of the plurality of bearing elements having a bearing surface, wherein at least one of the bearing surfaces of the plurality of bearing elements is positioned at a first radius;

with at least one adjustment mechanism, adjusting a radial position of all of the bearing surface of the at least one bearing element relative to the bearing ring such that the at least one bearing element is positioned at a second radius, the at least one adjustment mechanism including a retainer coupled to the fastener and configured to constrain radial displacement of the fastener relative to the bearing ring.

18. The method according to claim 17, wherein radially adjusting the position of the bearing elements relative to the bearing ring includes adjusting a plurality of adjustment mechanisms, each adjustment mechanism being associated with a one of the plurality of a bearing elements.

19. The method according to claim 17, wherein the plurality of bearing elements includes a plurality of worn bearing elements.

20. An apparatus comprising:
a first bearing assembly comprising at least a first bearing element coupled with the first bearing ring and having a first bearing surface;
a second bearing assembly comprising at least second bearing element coupled with second bearing ring and having a second bearing surface, the first and second bearing assembly being positioned so as to define a radial gap between the first bearing surface of the at least a first bearing element and the second bearing surface of the at least a second bearing element;
at least a first adjustment mechanism associated with the at least a first bearing element and configured to selectively adjust a radial position of all of the first bearing surface of the at least a first bearing element relative to the first bearing ring to alter the radial gap; and
at least a second adjustment mechanism associated with the at least a second bearing element and configured to selectively, radially adjust the at least a second bearing element relative to the second bearing ring to alter the radial gap.

21. The apparatus of claim 20, wherein the first bearing assembly is an outer radial bearing assembly and the second bearing assembly is an inner radial bearing assembly.

22. The apparatus of claim 20, wherein the first bearing assembly is an inner radial bearing assembly and the second bearing assembly is an outer radial bearing assembly.

\* \* \* \* \*